Figure 2:
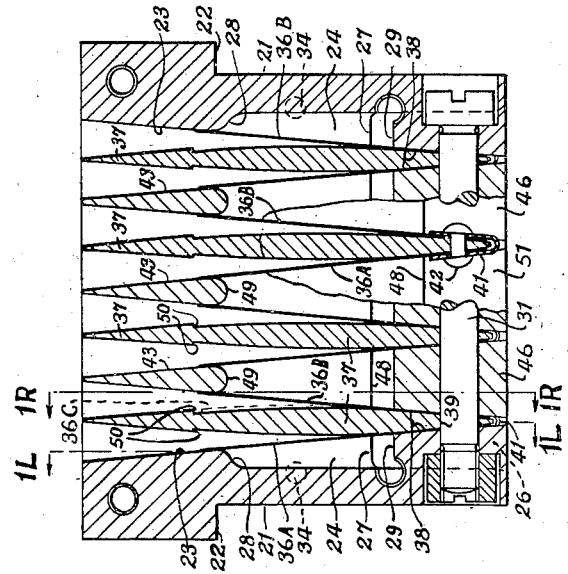

Sept. 24, 1946.  H. O. FARMER  2,408,056

NONRETURN VALVE

Filed Aug. 11, 1942   3 Sheets-Sheet 1

INVENTOR
Harold Oatridge Farmer
his ATTY.

Sept. 24, 1946.  H. O. FARMER  2,408,056
NONRETURN VALVE
Filed Aug. 11, 1942  3 Sheets-Sheet 2
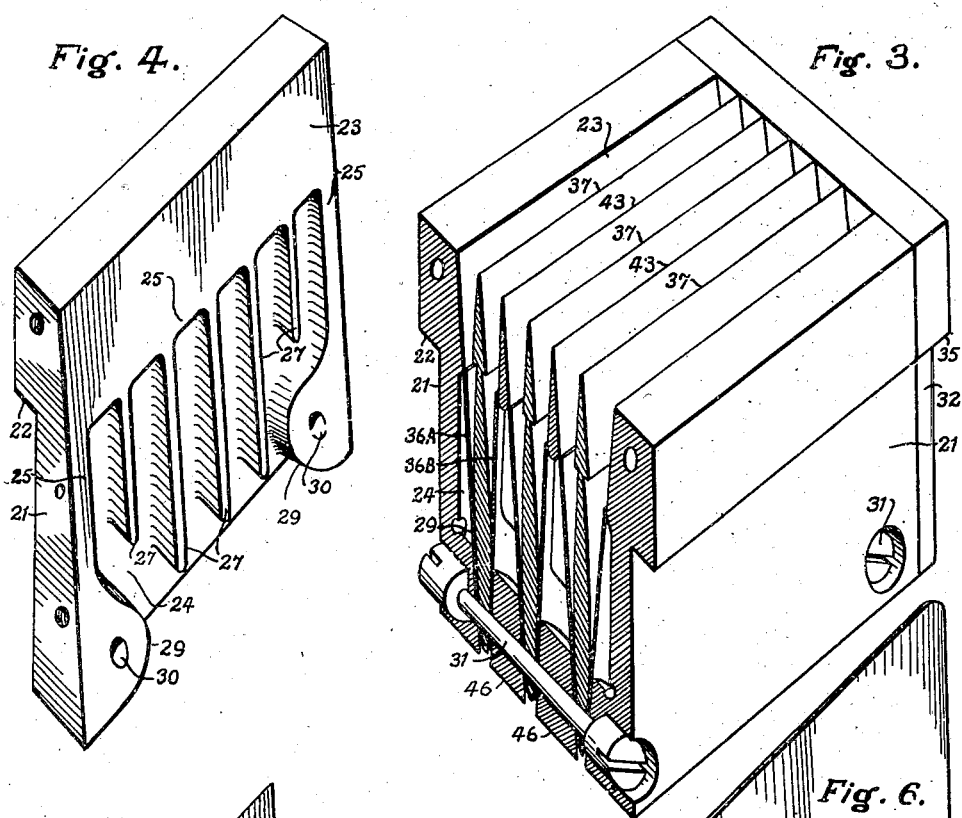
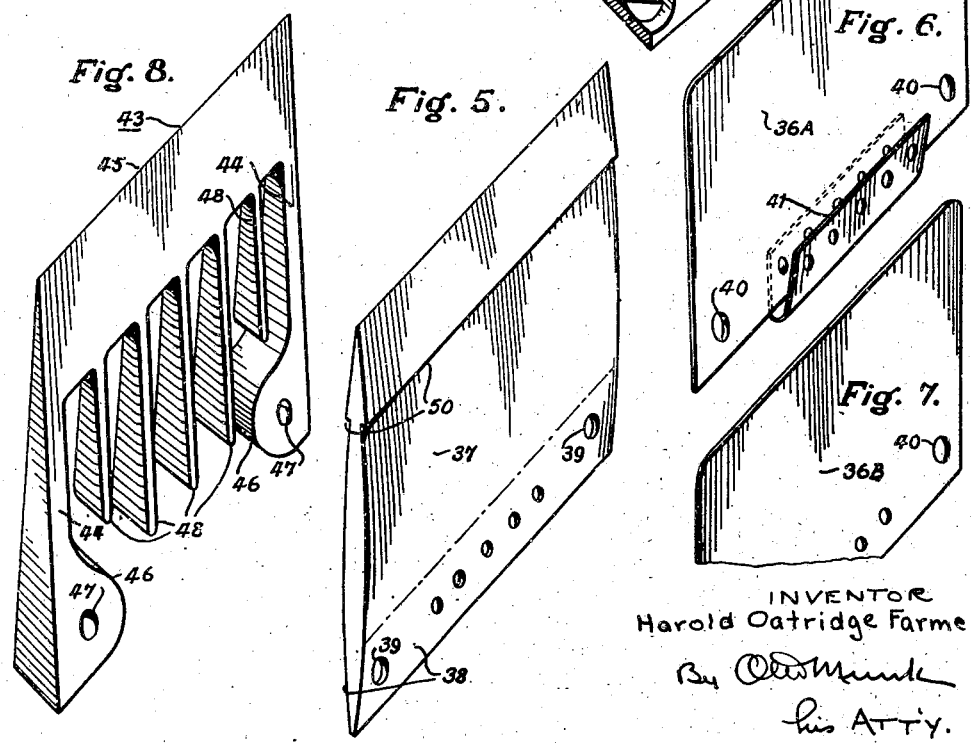
INVENTOR
Harold Oatridge Farmer Sept. 24, 1946.   H. O. FARMER   2,408,056
NONRETURN VALVE
Filed Aug. 11, 1942   3 Sheets-Sheet 3
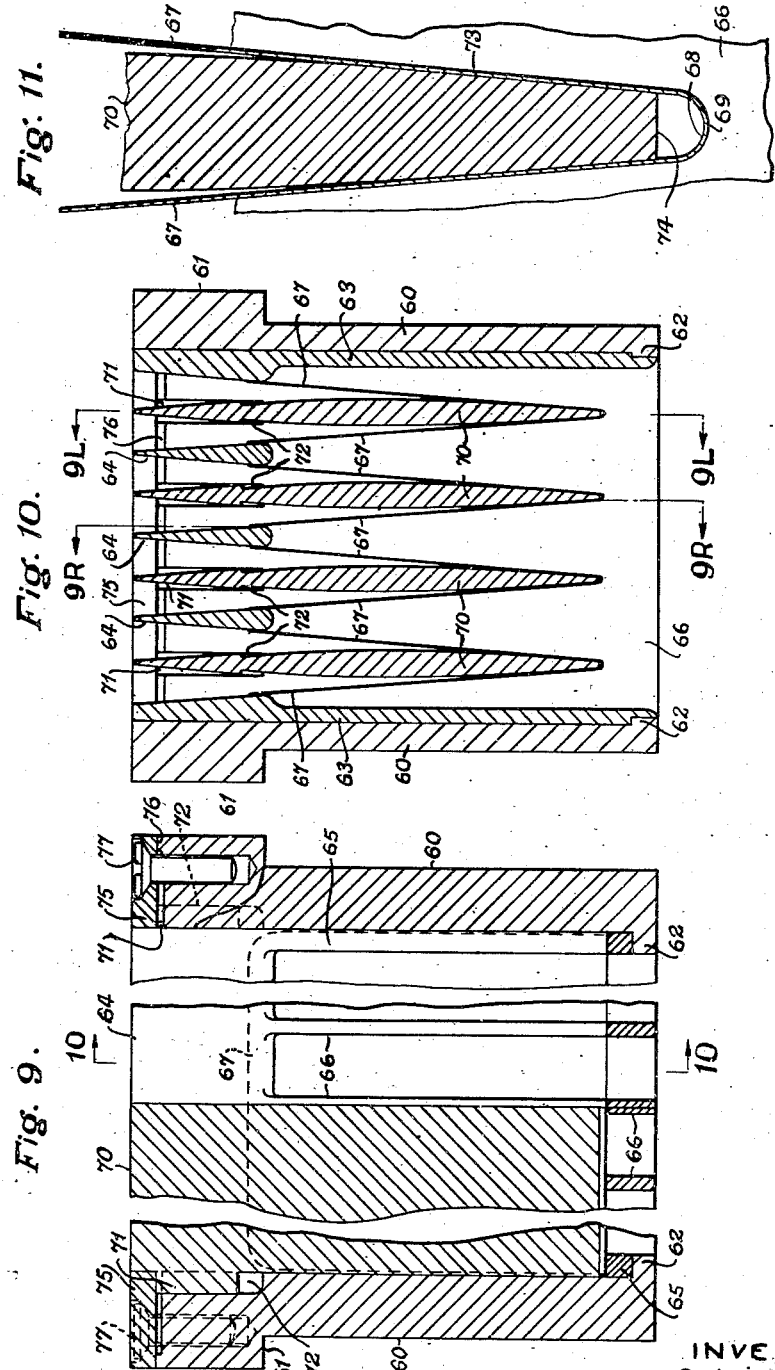
INVENTOR
Harold Oatridge Farmer Patented Sept. 24, 1946

2,408,056

UNITED STATES PATENT OFFICE 2,408,056

NONRETURN VALVE

Harold Oatridge Farmer, Hounslow, England, assignor to Alan Muntz & Company Limited, Hounslow, England, a company of Great Britain Application August 11, 1942, Serial No. 454,381
In Great Britain January 15, 1942

10 Claims. (Cl. 251—119)

This invention relates to an automatic non-return valve, suitable for use for example in air-compressors, and of the kind which in the fully open position provides a plurality of passages permitting the flow of a fluid medium without substantial change of direction, the valve having closure elements constituted by resilient laminae so mounted that, in the absence of pressure difference between the opposite sides thereof, they assume substantially their closed positions through their own resilience, and the laminae being arranged respectively in convergent-divergent passages in such a manner that the low pressure produced by fluid flow in or near the throats of the passages acts on the backs of the laminae and with the higher pressure acting on the fronts of the laminae holds them in the fully open position. Such a valve is described in Patent Specification No. 2,199,307.

This known valve provides the necessary pressure difference between the opposite sides of the laminae with only slight loss of pressure head of the fluid flowing through the valve, because the divergent parts of the passages are so designed that at the exit opening of the valve the greater part of the pressure dropped in the convergent part of the passages has been recovered.

An object of the present invention is to provide an improved valve of the kind hereinbefore specified having satisfactory performance characteristics and at the same time being easy to manufacture and assemble.

Another object is to provide such a valve capable of being constructed largely of die-castings.

Another object is to provide an improved arrangement for securing the fast portions of the closure laminae to the valve body which will reduce or eliminate risk of return leakage of fluid through the valve.

A further object is to provide an improved form of valve of the kind hereinbefore specified, in which the efficiency of operation and the durability can be raised by arranging for the inlet openings to have equal flow areas for each closure lamina.

A further object is to provide a compact valve of the kind hereinbefore specified, which enables excessive displacement of the free edges of the laminae to be avoided, with consequent improvement in their durability.

Figure 1:
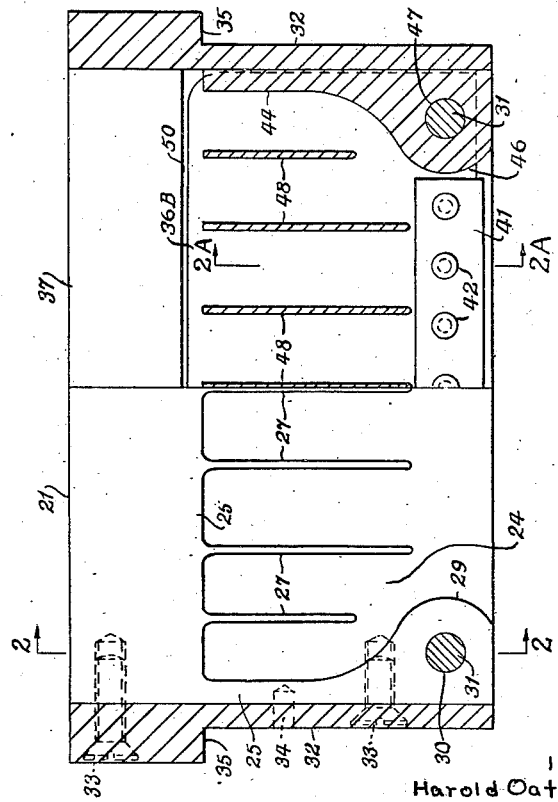

Further objects and advantages of the invention will become apparent from the following description, given by way of example, of embodiments thereof suitable for use in a reciprocating air-compressor, with reference to the accompanying drawings, in which:

Fig. 1 is a sectional side elevation of a valve adapted to be fitted in a housing of rectangular cross section, the left-hand half being taken on the line 1L—1L, and the right-hand half on the line 1R—1R in Fig. 2.

Fig. 2 is a sectional end elevation of the same valve, taken generally on the line 2—2 in Fig. 1, and a small part being taken on the line 2A—2A in Fig. 1, Fig. 3 is a perspective view of a valve, rather shorter and having fewer elements than but otherwise identical to that shown in Figs. 1 and 2, and sectioned on the plane corresponding to 2—2 of Fig. 1, Figs. 4 to 8 are perspective views of elements of the valve shown in Fig. 3, Fig. 4 showing a side valve seat member, Fig. 5 a stop plate, Figs. 6 and 7 respectively two closure laminae, and Fig. 8 an intermediate valve seat member, Fig. 9 is a sectional side elevation of a modified form of valve, the left-hand half being taken on the line 9L—9L, and the right-hand half on the line 9R—9R in Fig. 10, Fig. 10 is a sectional end elevation of this valve, taken on the line 10—10 in Fig. 9, and Fig. 11 is an enlarged view of a part of Fig. 10.

A valve as shown in Figs. 1 to 8 includes two identical side valve seat members 21, which may be pressure die castings, and which are of rectangular profile as viewed from the side as in Fig. 1. The outer faces of these members are substantially plane, so as to fit within a housing (not shown) and they are provided with a projecting step 22 at the outlet end, serving as a locating flange. The inner face 23 of each valve seat member is inclined at a small angle, which is 5° in this example, to the outer face, the inner face approaching the general plane of the outer face in the direction of air flow, which is upwards in Figs. 1 and 2. A depression 24 constituting an air port is formed over a large part of the inner face 23 leaving a seating border 25 (Fig. 4) at the top and ends. The depression 24 extends to the inlet edge of the member 21, forming an inlet opening 26 (Fig. 2). Vertical ribs 27 are provided in the depression 24 with their edges flush with the seating 25 for supporting a closure lamina when the valve is closed. The upper end of the depression 24 merges into the seating 25 by a curve 28 (Fig. 2) forming a convergent wall portion of the air passage. Near the inlet end and at each of the front and back ends of each member 21 is formed a boss 29 through which passes a bolt hole 30 disposed perpendicularly to the outer face.

The two side valve seat members 21 are placed face to face at a suitable distance apart, being tied together by two screw bolts 31 which pass through the holes 30. Furthermore, two end plates 32, which may be pressure die castings, are arranged to join the ends of the side valve seat members 21, being secured to the latter by countersunk screws 33 and dowels 34. These end plates have plane inner faces lying parallel to each other. The outer surfaces of the end plates are generally plane and provided with a step 35, matching the corresponding locating step 22 of the side valve seat members 21.

Adjacent to the inner face 23 of each side valve seat member 21 is mounted on the tie bolts 31 a closure sub-assembly including two closure laminae 36A and 36B disposed respectively on the two sides of a stop plate 37, which may also be a pressure die casting. The border of the stop plate 37 at its entry end is bevelled on each side at 38 at an angle equal to the angle of inclination of the inner face of the side valve seat members— in this example 5°. The borders of the two laminae 36A and 36B at their entry ends lie respectively flat on these two bevels 38. The stop plate has two holes 39 and each lamina has two holes 40 accommodating the tie bolts 31. A clamping strip 41 of sheet metal, bent into V section with the sides splayed at an angle of 10°, embraces the lower borders of the two laminae, being held in place by rivets 42 passing through the strip 41, the laminae and the interposed stop plate 37. The strip 41 stops short of the ends of the sub-assembly to enable the bosses 29 on the side valve seat member 21 to bear directly on the lamina 36A, which therefore normally lies with its side and discharge borders resting on the seating 25 of the member 21. The ends of the stop plate 37 bear against the inner faces of the end plates 32, while the ends of the laminae have only a small working clearance from the end plates.

An intermediate valve seat member 43, which may also be a pressure die casting, is placed next to the closure sub-assembly. In end elevation the member 43 is of wedge section, with its narrow end at the discharge end of the valve and its plane faces inclined to each other at an angle of 10°. This member 43 includes two end portions 44 and a bridge portion 45 (Fig. 8) joining the narrower ends of the end portions 44; the broader ends of the end portions are provided with bosses 46 through which pass holes 47 for the tie bolts 31. The plane faces on each side of the end and bridge portions 44 and 45 form valve seatings. A series of tapered webs 48 depend from the bridge portion, with their edges flush with these seatings, for supporting the laminae in their closed position. The under surface of the bridge portion is curved at 49 (Fig. 2) to form convergent wall portions of the air passages.

Beyond the first intermediate valve seat member is placed a second closure sub-assembly, and so on to any desired number, until the other side valve seat member 21 is reached, the number of closure sub-assemblies exceeding by one the number of intermediate valve seat members. The tie bolts 31 serve to clamp the several elements of the valve rigidly together.

In operation, when the pressure on the inlet side of the valve begins to exceed the pressure on the discharge side, the laminae are deflected away from the seatings towards the stop plates 37, so that a narrow gap is formed between the discharge border of each lamina and the adjacent seating. The reduced pressure occurring at these gaps owing to the high velocity of air flow through them is transmitted across the discharge edges of the laminae to the spaces between them and the stop plates. The resulting pressure difference on the two sides of each of the laminae causes them to be strained back close against the stop plates. The throat now formed in the air passages in the neighbourhood of the discharge edges of the laminae maintains a reduced pressure here, so that the laminae are subjected to a large enough pressure difference to keep them in the fully open position, indicated for one lamina by the dotted line 36C in Fig. 2.

Each valve closure lamina is flat or substantially flat in its unstressed condition; the movable borders of the lamina seat on a plane seating; the fixed border of the lamina is at all times rigidly held against the stop plate bevel 38 which is parallel to the seating and spaced therefrom by exactly the thickness of the lamina, since the ends of this fixed border of the lamina are clamped between the stop plate bevel 38 and the bosses 29 or 46 of the adjacent valve seat member. Consequently there is no difficulty in ensuring that, when the valve is shut, the laminae will effect a gas-tight closure, since all sealing occurs between surfaces which are plane and which therefore can be easily finished to the requisite degree of accuracy.

When the valve is open, the laminae bend to substantially the shape of a uniformly loaded cantilever, and the sides of the stop plates may be correspondingly shaped so that the laminae tend to bear on the stop plate over their entire area. Thus, referring to Fig. 5, the upper limit of the bevelled border of the visible face of the stop plate is denoted by the chain-dotted line, at which the plane portion of the face merges into the portion curved to the shape naturally assumed by the lamina when the valve is fully open. The laminae are consequently protected from overstressing at their roots and excessive impact stresses at their discharge edges, which might occur if the stop plate were of uniform thickness. Furthermore, the stop plate is preferably not provided with air-relief passages in its faces, since the resistance to movement of air between the back of a lamina and the adjacent stop plate is found to introduce a desirable damping of the valve movement. The stop plates are preferably provided with a step 50 on each side just deep enough to accommodate the discharge border of the lamina when the valve is fully open, so that the surface of the lamina and the surface of the stop plate, above the lamina, form a substantially continuous curve.

The laminae may be punched out of rolled steel strip, for example spring steel or 18–8 chromium-nickel steel may be used, and the direction of rolling of the strip is preferably at right angles to the lines of bending. The laminae may be punched to a size larger than the finished size, and finally reduced to finished size by grinding away a small portion of one or more of the edges so as to eliminate material that had been stressed during the cutting-out operation.

An important feature of this improved valve is that the entry can be divided into sections of equal flow area for each lamina. The area 26 through which air enters to each of the two outermost laminae is a rectangle formed by the wall of the side valve seat member 21, the part of the clamping strip 41 opposite thereto, and the bolt bosses 29 at the ends of the side valve seat member. The area 51 (Fig. 2) through which air enters to any pair of the other laminae is a rectangle formed by the parts of two clamping strips 41 and the bolt bosses 46 on an intermediate valve seat member. The area of the last-mentioned rectangle is made twice that of the first-mentioned rectangle, and the latter area is substantially larger than the throat area of an individual passage through the open valve.

The arrangement of the bolt bosses 29 and 46 at the inlet end of the valve not only enables the elements thereof to be rigidly tied together in predetermined relationship, with the closure laminae positively located with respect to the valve seats, but also gives the advantage that, although the bolt bosses limit the width of the air ports in the valve seat members adjacent to the entry end of the valve, the depth of these ports at this end is sufficient to provide the necessary inlet area, while nearer the outlet end of the valve the width of the ports is substantially increased, as compared with the width between the bolt bosses, with the result that the desired flow area is obtained through the throat of the valve at the outlet borders of the laminae without excessive displacement of these borders from their seats when the valve is fully open.

The valve described by way of example may have laminae of steel 0.007 in. thick, 35 mm. deep and 75 mm. long, the stop plates and the intermediate valve seat members being pitched at 5 mm. centre to centre, and the throats being 2.4 mm. wide when the valve is fully open.

Figs. 9 to 11 show, somewhat diagrammatically, a modified form of valve in which the laminae are made in pairs, of hair-pin section, and the several valve seat portions are of unitary construction.

A valve body casing 60, which may be die cast, or built up in the manner of the casing parts 21 and 32 of the valve shown in Figs. 1–8, is provided with an external locating flange 61 and an internal flange 62 at its entry end. The unitary valve seat structure consists of two side walls 63, any desired number of intermediate valve seat bars 64 and transverse ribs comprising two end valve seat ribs 65 and any desired number of intermediate ribs 66. These ribs are provided with 10° V-shaped notches which are aligned as seen in end view. Each row of notches accommodate a closure element of flat sheet steel bent into hairpin section to form a pair of closure laminae 67. The fold 68 (Fig. 11) of each closure element is bent around a relatively short radius and rests in a correspondingly curved arc 69 at the bottom of each V notch in the transverse ribs. Between the closure laminae of each pair is a stop plate 70 the upper part of which is provided with guide ears 71 slidable in keyways 72 in the end walls of the body casing 60. The section of each stop plate generally conforms to the natural shape of the closure laminae when the valve is open, as described with reference to the stop plates 37 of the example shown in Figs. 1–8, but the border portion of each stop plate from its entry edge to the level 73 in Fig. 11 is shaped as a 10° wedge truncated at 74 in such a manner that, when the stop plate is forced into the notches in the transverse ribs, it will nip the closure laminae tightly against the sides of these notches before the entry end 74 of the stop plate reaches the fold 68. The stop plates are held wedged into the notches by bars 75 resting at one edge on the ears 71 and at the other edge on ridges 76 on the ends of the body casing, these bars being clamped down by screws 77 engaging in the body casing.

The sides of the V notches and the lower borders of the stop plates can be accurately machined, and since in consequence the parts of the laminae near the fold are securely nipped between parallel surfaces, one of which is a plane continuation of the valve seat, the laminae will seat uniformly on the seatings when the valve is closed. Experience has shown that it is extremely difficult to shape such folded closure elements accurately to a desired section in the neighbourhood of the fold, and this improved construction is particularly advantageous in ensuring that, even if a closure element is not of exactly the desired section in the neighbourhood of the fold in its free state, nevertheless when it is assembled in the valve it is so deformed that it is constrained to bed in a fluid-tight manner on the valve seatings.

I claim:

1. A non-return valve including a plurality of separate seating members disposed side by side, the opposed seating faces of any adjacent pair of said seating members being plane and receding from each other in the direction of fluid flow, and said seating members having in said opposed faces inlet ports extending to the entry edge of said faces, two bolt bosses on each of said seating members disposed respectively at the ends thereof adjacent to the entry end of the valve, the faces of said bosses forming continuations of said plane seating faces, resilient closure laminae capable of lying flush on each of said plane seating faces respectively and shaped to overlap said ports and to extend over said bosses, separate stop plates disposed respectively between each two of said closure laminae that are associated with each adjacent pair of said seating members, said stop plates having adjacent to their entry edges a wedge-shaped cross section, the plane faces of such wedge portion receding from each other in the direction of fluid flow at the same inclination as said opposed seating faces, and two tie bolts passing respectively through the aligned series of said bolt bosses at each end of the valve and through bolt holes in said stop plates and said laminae, said bolts clamping said seating members, the entry borders of said laminae and said stop plates rigidly together, and said ports being wider (as measured in the planes of said seating faces respectively and normally to said direction of fluid flow) adjacent to the free borders of said laminae than between said bosses.

2. A non-return valve including a plurality of separate seating members disposed side by side, the opposed seating faces of any adjacent pair of said seating members being plane and receding from each other in the direction of fluid flow, said seating members having in said opposed faces inlet ports extending to the entry edge of said faces, resilient closure laminae capable of lying flush on each of said plane faces respectively and shaped to overlap said ports, separate stop plates disposed respectively between each two of said closure laminae that are associated with each adjacent pair of said seating members, said stop plates having adjacent to their entry edges a wedge-shaped cross section, the plane faces of such wedge portion receding from each other in the direction of fluid flow at the same inclination as said opposed seating faces, means clamping said seating members, the entry borders of said laminae and said stop plates rigidly together, and additional means clamping within the width of said ports each adjacent pair of said laminae to the entry border of the one of said stop plates interposed between them.

3. A non-return valve of the kind specified including a valve seat member the end elevation of which, as viewed normal to the general direction of fluid flow, is a wedge narrowing in said direction, said member including two end portions, a bridge portion joining said end portions at their narrower ends and a plurality of webs extending from said bridge portion, the edges of said webs lying in the planes of seating faces on said end and bridge portions, two resilient closure laminae which are substantially flat in their unstrained condition and which are disposed respectively on the two sides of said valve seat member, two separate stop plates for supporting said laminae in the open position and disposed respectively adjacent to said laminae, with one border engaging the border of the associated lamina at the entry end and the opposite border spaced from said valve seat member, means clamping said laminae between the broader ends of said end portions of the valve seat member and said stop plates, and separate means clamping the borders of said laminae at the entry end of the valve in a fluid tight manner to said stop plates between said end portions of the valve seat member.

4. A non-return valve including two separate side valve seat members, any desired number of separate intermediate valve seat members disposed between said side valve seat members, each adjacent two of said members having opposed plane seating faces diverging in the direction of fluid flow, and said members having in each of said seating faces ports extending to the edges at the entry end of the valve, a plurality of separate stop plates disposed respectively between said valve seat members, each of said stop plates having its border near the entry edge bevelled to a wedge section, the angle of which equals the angle of divergence of said opposed seating faces, a plurality of resilient laminae disposed respectively between each adjacent seat member and stop plate and overlapping said ports, and locating members spanning between said side valve seat members at both the front and back of the valve near its entry end and engaged with each of said valve seat members, stop plates and laminae so as to maintain them positively locked together at the entry end of the valve, the width of said ports (as measured in the planes of said seating faces respectively and normally to said direction of fluid flow) being a minimum between said locating members and substantially larger than said minimum adjacent to the outlet end of the valve.

5. A non-return valve including two separate side valve seat members, any desired number of separate intermediate valve seat members disposed between said side valve seat members, each adjacent two of said members having opposed plane seating faces diverging in the direction of fluid flow, and said members having in each of said seating faces ports extending to the edges at the entry end of the valve, a plurality of separate stop plates disposed respectively between said valve seat members, each of said stop plates having its border near the entry edge bevelled to a wedge section, the angle of which equals the angle of divergence of said opposed seating faces, a plurality of resilient laminae disposed respectively between each adjacent seat member and stop plate and overlapping said ports, two bolts tying together said side valve seat members and disposed near the entry ends thereof, said bolts passing through bolt holes in said intermediate valve seat members, stop plates and laminae, and the width of said ports (as measured in the planes of said seating faces respectively and normally to said direction of fluid flow) being a minimum between said bolts and substantially larger than said minimum adjacent to the outlet end of the valve.

6. A non-return valve including a valve body which comprises two side valve seat members spaced apart face to face and two end plates bridging between the ends of said members and secured thereto by screws to form a rigid tube of substantially rectangular section, any number of separate intermediate valve seat members disposed between said side valve seat members, the opposing faces of each adjacent two of said seat members being plane and diverging from each other in the direction of fluid flow and having inlet ports extending to the edges at the entry end of the valve, a plurality of separate stop plates disposed respectively between each adjacent two of said seat members and bevelled at the entry border to a wedge section conforming to the divergence of said opposing seating faces, said intermediate members and said stop plates extending from one of said end plates to the other, a plurality of closure laminae disposed respectively between each of said seating faces and the one of said stop plates adjacent thereto, said laminae being shaped to overlap and seal said ports, and means maintaining the entry borders of said laminae rigidly nipped between the respective seating faces of said valve seat members and the bevelled faces of said stop plates.

7. In a non-return valve of the kind specified, seating members having two opposed plane seating faces diverging from each other in the direction of fluid flow, said faces being interrupted by ports extending from their edges nearest the inlet end of the valve, a resilient closure element comprising a unitary sheet folded into hairpin section and disposed with its blades positioned to line on said faces and cover said ports therein, a stop plate disposed between said blades and having its border nearest the inlet end of the valve of wedge section to correspond to the angle of divergence of said seating faces, and means maintaining said blades nipped between said seating faces and said wedge-section portion of said stop plate, said wedge section portion being so truncated that the stop plate does not bottom in the fold of the closure element.

8. In a non-return valve of the kind specified, seating members having two opposed plane seating faces diverging from each other in the direction of fluid flow, said faces being interrupted by ports extending from their edges nearest the inlet end of the valve, a stop plate disposed between said seating faces and having its border nearest the inlet end of the valve bevelled to conform to the angle of divergence of said seating faces, two resilient laminae disposed between said stop plate and said seating members for sealing said ports therein, means maintaining the ends of said laminae adjacent to their entry edges rigidly nipped between said seating members and said stop plate, and a V-section strip secured to and embracing the borders of said laminae intermediate their said ends.

9. In a non-return valve of the kind specified, seating members having two opposed plane seating faces diverging from each other in the direction of fluid flow, said faces being interrupted by ports extending from their edges nearest the inlet end of the valve, a stop plate disposed between said seating faces and having its border nearest the inlet end of the valve bevelled to conform to the angle of divergence of said seating faces, two resilient laminae disposed between said stop plate and said seating members for sealing said ports therein, means maintaining the ends of said laminae adjacent to their entry edges rigidly nipped between said seating members and said stop plate, a plurality of rivets each passing through the borders of said stop plate and of said laminae intermediate the said ends of the latter, and sheet metal reinforcement strip interposed between the heads of said rivets and said laminae.

10. A non-return valve including a valve seat member having a plane seating face of substantially rectangular outline, which lies substantially parallel to the general direction of fluid flow through the valve and which surrounds a port except at the inlet end of the valve where said port extends to the edge of said seat member, a pair of bolt holes passing through said seat member transversely to said face and respectively on the two sides of said port at the inlet end of said valve, a resilient closure lamina of substantially rectangular outline co-operating with said valve seat member and overlapping the border of said port, the width of said lamina being substantially equal to the width of said seat member, a stop member disposed on the side of said lamina remote from said valve seat member and having at the entry end of the valve a plane border parallel to said seating face, two ties passing transversely to the direction of flow through said bolts holes respectively, and being positively engaged with said lamina and said stop member, said ties serving both to clamp a border of said lamina between said border of the stop member and said faces of the seat member and also to key said seat member, said lamina and said stop member together, and two end plates parallel to each other and co-operating with said seat member and said stop member to form a passage of uniform width, said plates serving to prevent substantial leakage of fluid round the longitudinal edges of said lamina when the valve is open.

H. O. FARMER.